United States Patent Office 2,909,545
Patented Oct. 20, 1959

2,909,545

CHROMIUM COORDINATION COMPLEXES

William S. Barnhart, Cranford, N.J., assignor, by mesne assignments, to Minnesota Mining and Manufacturing Company, St. Paul, Minn., a corporation of Delaware No Drawing. Application March 11, 1955
Serial No. 493,820

7 Claims. (Cl. 260—438)

This invention relates to chromium coordination complexes of perchlorofluoromonocarboxylic acids having from 4 to 20 carbon atoms. The compounds are solids which are slightly soluble in water and are highly soluble in acetone and alcohols.

The complexes are prepared by reacting perchlorofluoromonocarboxylic acids having from 4 to 20 carbon atoms with trivalent chromium compounds which are at least one third basic. Chromium compounds of this type are, for example, chromyl chloride, which is a hexavalent chromium compound which is reduced by an alcohol or other reducing agent during the complex-forming reaction to an oxygen-containing trivalent chromium compound, and it is this latter compound that forms the complex. Other chromium compounds which may be used are those which are initially in the trivalent state, such as chromic chloride, chromic bromide, chromic nitrate, and chromic acetate, these compounds being partially hydrolyzed in the presence of the perchlorofluoromonocarboxylic acid. In any event, the chromium compound entering the complex must contain at least one hydroxyl group.

When using the complexes as waterproofing agents, the chromyl halogen must be hydrolyzed just prior to or during application of the complexes to surfaces which it is desired to render water repellent. The hydrolyzed group Cr—OH polymerizes on standing for a period of 4 to 12 hours at room temperature or upon heating at a temperature of 50 to 100° C. for a period of one hour. In this use the pH of the final aqueous solution should be between about 3 and 4.5, since self-polymerization and decomposition are accelerated if the pH is above this range, and if the pH is below this range, the materials to be waterproofed are sometimes tenderized, as when the complexes are used in waterproofing paper.

In the preparation of the preferred chromyl chloride complexes, a solution of chromyl chloride in an inert solvent is added to a solution of a reducing agent, such as an alcohol, and a perchlorofluoromonocarboxylic acid in the inert solvent. Heat is evolved during the addition, and the reaction mixture may be refluxed for a period of 1 to 4 hours. The solution may then be evaporated, leaving the solid complex. The complex may then be prepared as a solution in acetone or alcohol and the like, and this solution may be diluted with water prior to the use of the complex as a waterproofing agent.

Preferably, the complexes are prepared under anhydrous conditions and stored as 20 weight percent solutions in anhydrous isopropyl alcohol. These solutions are diluted with water to form a 1 to 5 percent by weight solution just prior to application as waterproofing agents. A buffer, such as an alkali metal carbonate, phosphate, citrate, acetate, formate or borate or urea, is used to regulate the pH of the solution if necessary. Coated articles are usually oven dried.

In addition to being useful as waterproofing agents for waterproofing hydrophilic substances, such as cloth, leather, and the like, the complexes may also be used as sizing agents for glass cloth and as chemically resistant coatings for fabrics, glass, metals, and the like.

The perchlorofluoromonocarboxylic acids which may be used in the process of this invention are perchlorofluoromonocarboxylic acids having from about 4 to about 20 carbon atoms, and these acids may be prepared in a variety of ways. For example, they may be produced by subjecting perhalogenated aliphatic olefins having at least 7 carbon atoms and being at least half fluorinated to oxidation conditions in the presence of a vigorous oxygen-containing oxidation reagent, such as free oxygen in the presence of ultraviolet light, free oxygen in the presence of elemental fluorine, and permanganate salts in a liquid medium. Preparation of the acids according to this method is disclosed in copending application, Serial No. 452,706, filed August 27, 1954.

The acids may also be prepared by subjecting aliphatic perhalogenated high polymers to thermal cracking conditions to produce lower molecular weight unsaturated materials having molecular weights in the oil or wax range and subjecting these materials to oxidation at a temperature not higher than about 10° C. in the presence of a permanganate salt in a liquid medium. Processes of this type are disclosed in copending application, Serial No. 452,704, filed August 27, 1954.

Another method for the preparation of perchlorofluorocarboxylic acids which are useful in the present invention comprises treating fluorine-containing telomers having the formula $$M(CF_2-CX_1X_2)_nBr$$

in which M is a perhalomethyl radical having a total atomic weight not higher than 146.5, $X_1$ and $X_2$ are fluorine or chlorine atoms, and $n$ is an integer from 2 to 16 with fuming sulfuric acid at a temperature of at least 125° C. This process produces carboxylic acids having the formula $$Z(CF_2-CFCl)_{n-1}CF_2COOH$$

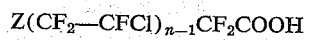

in which Z is a carboxylic acid radical or a perhalomethyl radical having a total atomic weight not in excess of 146.5 and $n$ is an integer from 2 to 16. The preparation of these acids is disclosed in copending application, Serial No. 452,703, filed August 27, 1954, and issued on September 17, 1957, as Patent No. 2,806,865.

The preferred process for the preparation of perchlorofluorocarboxylic acids useful in the process of the present invention is the hydrolysis of telomers produced by telomerizing perhaloolefins using sulfuryl chloride as a telogen, the preferred telomer being the telomerization product of chlorotrifluoroethylene and sulfuryl chloride. The hydrolyzed telomer has the formula $$Z-CFCl-(CF_2CFCl)_{n-2}-CF_2-COOH$$

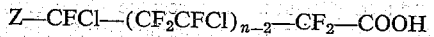

in which Z is a carboxylic acid radical or a perhalomethyl radical in which all the halogen atoms are fluorine or chlorine and $n$ is an integer from 2 to 16. The preparation of these acids is disclosed in copending application, Serial No. 452,705, filed August 27, 1954, and issued on September 17, 1957, as Patent No. 2,806,866.

While certain of the disclosures of the foregoing copending applications relate to the preparation of dicarboxylic acids as well as monocarboxylic acids, only the perchlorofluoromonocarboxylic acids are used to form the chromium coordination complexes of the present invention.

The reaction is conducted at the refluxing temperature of the reaction mixture which depends upon the boiling point of the solvent but in general is between 25° C. and 100° C. The ratio of chromium compound to perchlorofluoromonocarboxylic acid is about 0.3 to 3.0 moles of chromium compound per mole of acid. The inert anhydrous solvent may be present in a quantity equivalent to about 1 to 10 moles of solvent per mole of acid, and the reducing agent is present in a quantity equivalent to about 1 to 3 moles per mole of chromium compound.

The preferred chromyl chloride complexes of the present invention have the probable formula

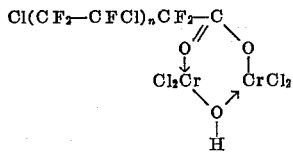

in which $n$ is an integer from 1 to about 9. It will be seen that the complexes contain combined chlorine atoms. These chlorine atoms can be hydrolyzed or ammoniated to form derivative complexes which are slightly water soluble and highly soluble in acetone and alcohols and which homopolymerize to a highly water insoluble state. As previously noted, the complex can be hydrolyzed before or after being coated on a surface.

The invention will be further illustrated by reference to the following specific examples:

EXAMPLE 1

*Chromyl chloride complex of $Cl(CF_2\text{---}CFCl)_3CF_2COOH$*

Chromyl chloride (0.1 mole) dissolved in 50 ml. of dichloromethane was added drop-wise to a solution of ethanol (0.055 mole) and $Cl(CF_2\text{---}CFCl)_3CF_2COOH$ (0.05 mole) in 100 ml. of dichloromethane. Heat was evolved during the addition, and the solution was refluxed for a period of one hour. The solution was evaporated leaving 35 grams of a deep red solid complex. An acetone solution of the complex was prepared, and samples of filter paper and cloth dipped in the solution and dried in an oven were found to be water repellent.

EXAMPLE 2

*Chromyl chloride complex of $Cl(CF_2\text{---}CFCl)_3CF_2COOH$*

To a stirred, refluxing solution of $$Cl(CF_2CFCl)_3CF_2COOH$$

(0.028 mole), isopropyl alcohol (0.054 mole) and carbon tetrachloride (125 ml.) was added drop-wise a solution of chromyl chloride (0.058 mole) in carbon tetrachloride (~45 ml.). Additional isopropyl alcohol (0.033 mole) was needed to reduce all the chromyl chloride to the $Cr^{+++}$ form (green). The resulting mixture was refluxed for one hour, cooled, and concentrated under reduced pressure. The residue (26.9 grams) was dissolved in dry isopropyl alcohol (108 grams) and filtered.

EXAMPLE 3

*Chromic nitrate complex of $Cl(CF_2\text{---}CFCl)_3CF_2COOH$*

A solution (pH~5) of $Cl(CF_2CFCl)_3CF_2COOH$ (0.03 mole) in water (100 ml.) was diluted with a solution of $Cr(NO_3)_3 \cdot 9H_2O$ (0.06 mole) in water (25 ml.). The resulting mixture was heated to boiling and allowed to cool. The aqueous layer was separated by decantation. The lower organic layer was dried (24 grams), dissolved in isopropyl alcohol (96 grams) and filtered.

EXAMPLE 4

*Chromic acetate complex of $Cl(CF_2\text{---}CFCl)_3CF_2COOH$*

A solution (pH~5) of $Cl(CF_2CFCl)_3CF_2COOH$ (0.03 mole) in water (100 ml.) was diluted with a solution of $Cr(OAc)_3 \cdot H_2O$ (0.06 mole) in water (40 ml.). The resulting mixture was heated to boiling, whereupon a blue-gray solid precipitated. After being allowed to cool, the solid was filtered, dried (19.5 grams) and dissolved in isopropyl alcohol. The alcohol solution was filtered.

EXAMPLE 5

*Evaluation of chrome complexes of $Cl(CF_2CFCl)_3CF_2COOH$*

The various chrome complexes prepared were tested for waterproofing properties. After dilution with water (some containing a neutralizing solution), filter paper was coated by dipping followed by drying in an oven at elevated temperatures. The neutralizing solution was prepared by dissolving urea (16.5 grams), sodium formate (5.0 grams) and formic acid (0.2 gram) in 78.3 ml. of water. The following table contains the data evaluating these preparations:

EVALUATION OF CHROME COMPLEXES AS WATERPROOFING COATINGS

| Chrome complex | Volume, ml. (20% solutions in isopropyl alcohol) | Water, ml. | Neutralizing sol., ml. | pH of sol. | Drying temp., °C. | Waterproofing properties |
|---|---|---|---|---|---|---|
| 1a | 2 | 98 | 0 | 3.33 | 120 | Good. |
| 2a | 2 | 96 | 2 | 4.53 | 120 | Poor to fair. |
| 3a | 2 | 98 | 0 | 2.84 | 120 | Tenderized paper. |
| 4a | 2 | 96 | 2 | 4.27 | 120 | Poor to fair. |
| 5a | 5 | 95 | 0 | 2.86 | 110-120 | Tenderized paper. |
| 6b | 5 | d95 | 0 | 2.80 | 110-120 | Do. |
| 7c | 5 | d95 | 0 | 4.27 | 110-120 | Poor to fair. |
| 8a | 5 | 94 | 1 | 3.78 | 120 | Fair to good. |
| 9a | 5 | 93 | 2 | 4.05 | 120 | Do. |
| 10a | 5 | 92 | 3 | 4.20 | 120 | Do. | a Prepared from $CrO_2Cl_2$.
b Prepared from $Cr(NO_3)_3 \cdot 9H_2O$.
c Prepared from $Cr(OAc)_3 \cdot H_2O$.
d A definite precipitate appeared on dilution with water.

Of the preparative methods tried, the one involving $CrO_2Cl_2$ appears to yield the material with the best waterproofing properties. The waterproofing properties of these preparations appear to be quite good, especially when water is allowed to drop slowly on treated material (paper or cloth). Careful control of pH is essential because a low pH (<3) causes tenderization of paper and a high pH (>4.5) decomposes the complex and precipitation occurs. The chromium polymer is unaffected by acetone.

It will be obvious to those skilled in the art that many modifications may be made within the scope of the present invention without departing from the spirit thereof, and the invention includes all such modifications.

I claim:

1. Chromium coordination complexes selected from the group consisting of (A) the coordination complex formed by the reaction of a trivalent chromium compound which is at least one third basic with a perchlorofluoromonocarboxylic acid corresponding to the formula $$Cl(CF_2\text{---}CFCl)_nCF_2COOH$$

wherein $n$ is an integer from 1 to 9, and (B) the hydrolyzed derivatives thereof.

2. The complex of claim 1 wherein said chromium compound is formed by hydrolysis of chromic nitrate.

3. The complex of claim 1 wherein said chromium compound is formed by hydrolysis of chromic acetate.

4. The complex of claim 1 wherein said chromium compound is formed by reduction of chromyl chloride in the presence of an alcohol reducing agent.

5. Chromium coordination complexes selected from the group consisting of (A) the coordination complex formed by the reaction with one another in an inert anhydrous solvent and in the presence of an alcohol reducing agent of a trivalent chromium compound which is at least one third basic and a perchlorofluoromonocarboxylic acid corresponding to the formula $$Cl(CF_2CFCl)_nCF_2COOH$$

wherein $n$ is an integer from 1 to 9, and (B) the hydrolyzed derivatives thereof.

6. A complex as in claim 5 wherein said chromium compound is formed by reduction of chromyl chloride in the presence of said reducing agent.

7. A complex as in claim 6 wherein $n$ is 3.

References Cited in the file of this patent

UNITED STATES PATENTS

| | | |
|---|---|---|
| 2,524,803 | Iler | Oct. 10, 1950 |
| 2,559,629 | Berry | July 10, 1951 |
| 2,662,835 | Reid | Dec. 15, 1953 |
| 2,693,458 | Olson | Nov. 2, 1954 |
| 2,766,215 | Stoops et al. | Oct. 9, 1956 |